United States Patent Office 3,398,450
Patented Aug. 27, 1968

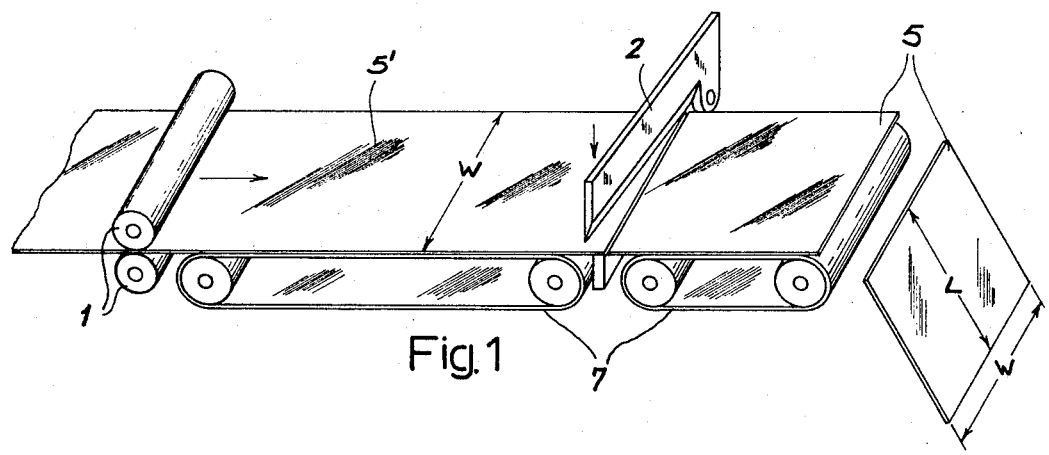
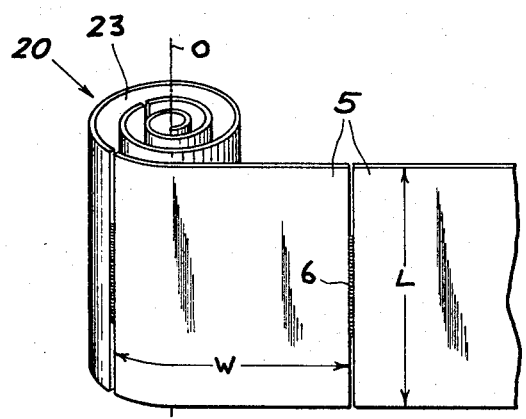
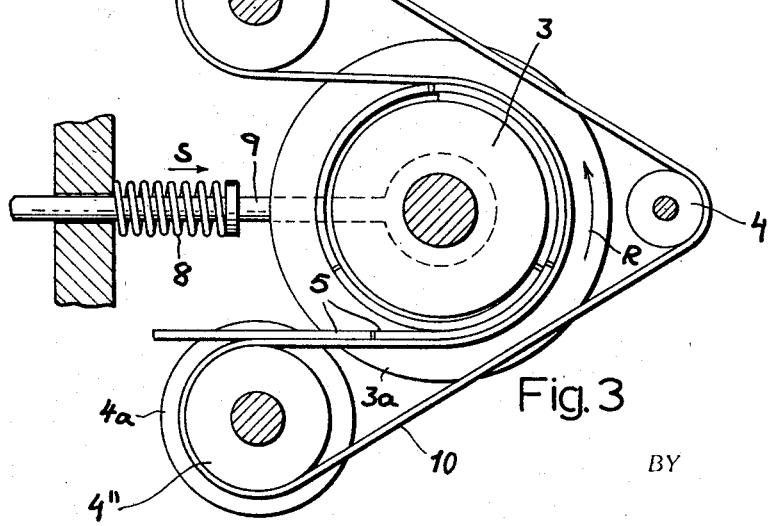
Vadim Subovici
INVENTOR.
Karl F. Ross
Attorney

3,398,450
PROCESS FOR MAKING WOUND
MAGNETIC CORE
Vadim Subovici, Blvd. Republicii 58,
Bucharest, Rumania
Continuation-in-part of application Ser. No. 498,816,
Oct. 20, 1965. This application Nov. 15, 1967, Ser.
No. 688,295
Claims priority, application Rumania, Nov. 24, 1964,
48,821; Nov. 25, 1964, 48,828
4 Claims. (Cl. 29—605)

ABSTRACT OF THE DISCLOSURE

An elongate strip of magnetically permeable sheet material, e.g. steel, preferably rolled so as to have its grains oriented in longitudinal direction, is cut into sections of equal length L which are then successively coiled about a common axis parallel to their dimension L to form a spirally wound cylinder. The sections may be interconnected, before or after winding, by welding or soldering and may be wound with the turns of the spiral spaced apart to leave axially extending voids for the passage of a cooling fluid.

---

This application is a continuation-in-part of my copending application Ser. No. 498,816, filed Oct. 20, 1965.

My present invention relates to coiled cylindrical magnetic cores wound from strips of magnetically permeable sheet material, such as steel, for the legs of transformer armatures, reactors or the like, as well as to a process for manufacturing such cores.

Conventional coiled magnetic cores have the shortcoming that their height, i.e. axial dimension, is limited by the original width of the strips from which they are wound; this requires axial superposition of several such coils whenever the length of the core exceeds the width of the strips, thereby tending to introduce additional air gaps. Also, the need for reducing the current flow due to induced voltage dictates the formation of radial slits, to be filled with insulating material, whose presence decreases the mechanical strength of the core.

The principal object of this invention is to provide an improved magnetic core avoiding the aforestated disadvantages.

Another object is to provide a process for making a core with relatively staggered gaps, avoiding the need for a separate slitting operation.

It is also an important object of this invention to provide a method of forming a core of the character described, of any axial length, in which the crystals or grains of the magnetic material are oriented in axial direction, i.e. in the direction of the flux to be generated.

In accordance with this invention I form a coiled magnetic body, of axial length L, from a strip of magnetically permeable sheet material, preferably rolled steel, having a width W which is independent of the core length L and may in fact be substantially smaller than L. From this strip I cut sections of the aforestated length L which are then successively wound, with closely adjoining edges, about a common axis to form an Archimedean spiral; in this operation the strip sections or sheets are so oriented that their longitudinal dimension L is parallel to the winding axis. In order to maintain continuity between adjoining sections, I prefer to bond them together, either before or after bending them about a mandrel, by soldering or welding. The joints between the sections will generally be relatively staggered in the finished body since, upon their successive coiling around the mandrel, they will be bent with progressively increasing radii of curvature. The turns of the spiral may be left in contact with one another but, according to another feature of my invention, can also be separated by a spiral clearance to form axially extending voids for the passage of a cooling fluid.

The invention will be described in greater detail with reference to the accompanying drawing in which:

FIG. 1 is a perspective view of a device for slicing sections from a strip of grain-oriented sheet steel;

FIG. 2 is a perspective view of a series of strip sections, obtained from the device of FIG. 1, wound into a core according to the invention; and FIG. 3 is a top plan view of an assembly for producing the core of FIG. 2.

In FIG. 1 I have shown a set of rollers 1 delivering a strip of grain-oriented sheet steel 5' to a periodically operating cutter 2 over a conveyor 7. The cutter 2 slices from the strip 5' a series of rectangular sections 5 having a length L and a width W, the latter being the width of the strip 5'. Length L is the dimension of grain orientation of the magnetic material.

FIG. 2 shows a core 20 spirally wound from a magnetic layer which is composed of a multiplicity of closely adjoining sheets 5 obtained from the strip 5' of FIG. 1. The strips have been bonded to one another by welding or soldering, as shown at 6, it being apparent that the joints thus formed may extend over the entire length of their confronting edges or over any portions thereof. The turns of the spiral are separated so as to form a clearance 23 which serves for the circulation of a cooling medium and also eliminates short circuits between the turns. Short circuits in peripheral direction can be prevented by the separation of adjoining sheets 5 and the use of high-resistance solder. It will be noted that the longitudinal dimension L of each sheet extends parallel to the axis O of the spiral body 20.

FIG. 3 shows a device for producing the core 20 of FIG. 2. The device comprises a flexible endless element 10, such as a belt, band or cord, wound about a number of rollers of which three have been illustrated 4, 4' and 4". The element 1 also curves about a cylindrical mandrel 3 which is radially shiftable and under pressure from a pair of springs 8 (only one shown), bearing upon respective supporting arms 9 in the direction of arrow S, to hold the band 10 taut. One or more of the rollers may be driven so that the band moves in the direction of arrow R. The sheets 5 are introduced, one after the other, into the gap between band 10 and mandrel 3 so as to bend about the mandrel axis and form an Archimedean spiral. When the necessary number of sheets 5 have been thus assembled into a coil, the resulting cylindrical body may be temporarily held in position by clamping rings, wires or the like, not shown, preferably after allowing a certain radial expansion of the turns to form the spiral clearance 23 of FIG. 2. The body is annealed in a protective inert atmosphere whereupon the retaining means can be replaced by permanent reinforcements and/or an insulating casing.

Mandrel 3 and roller 4" are shown provided with respective flanges 3a, 4a to guide the edges of the sheets.

The axial orientation of the crystals or grains of the constituent sheets 5 of my improved transformer core reduces its magnetic reluctance in the direction of flux as compared with laminations of nonoriented or differently oriented material.

I claim:

1. A process for making a cylindrical magnetic core, comprising the steps of producing an elongate strip of grain-oriented magnetically permeable sheet material, cutting said strip into a succession of sections of the same length in the original longitudinal direction of the strip which coincides with the direction of grain orientation, forming a spirally wound body by successively bending said sections about an axis with their original dimension of length parallel to said axis, and securing the sections together to solidify said body.

2. A process as defined in claim 1 wherein said sections are bonded to one another on being wound about said axis.

3. A process as defined in claim 2 wherein said body is annealed after the constituent sheets thereof have all been bent about said axis.

4. A process as defined in claim 1 wherein said body is wound with radially spaced-apart turns to form axially extending voids for the circulation of a cooling medium.

References Cited

UNITED STATES PATENTS

| | | | |
|---|---|---|---|
| 1,365,569 | 1/1921 | Troy | 336—218 |
| 3,032,863 | 5/1962 | Steinmayer et al. | 336—213 X |

LARAMIE E. ASKIN, *Primary Examiner.*

D. A. TONE, *Assistant Examiner.*